Sept. 21, 1954        F. A. STIRRUP        2,689,675
DEVICE FOR INJECTING A FLUID MASS INTO PNEUMATIC TIRES
Filed May 9, 1952
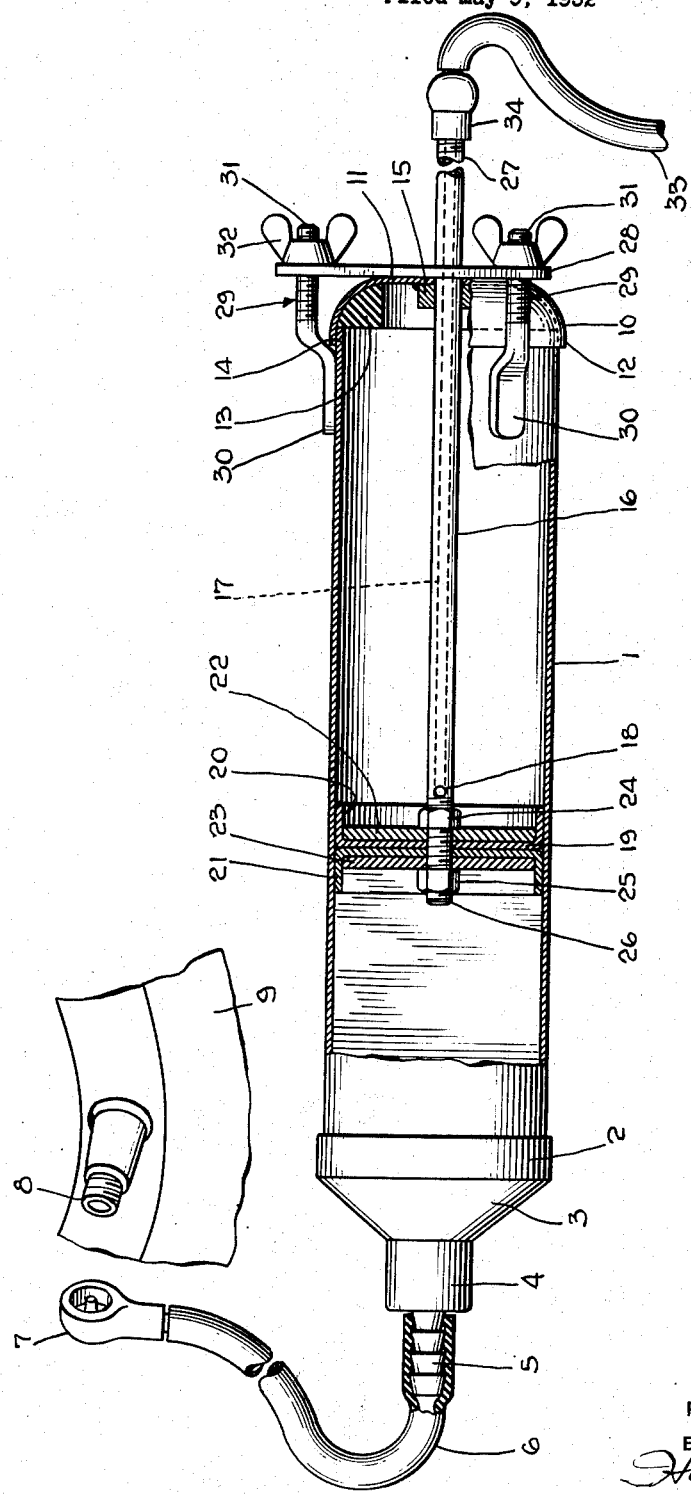
INVENTOR
FRANK A. STIRRUP
BY
*Howard P. Thompson*
ATTORNEY

Patented Sept. 21, 1954

2,689,675

UNITED STATES PATENT OFFICE 2,689,675

DEVICE FOR INJECTING A FLUID MASS INTO PNEUMATIC TIRES

Frank A. Stirrup, Plainfield, N. J.

Application May 9, 1952, Serial No. 286,917

2 Claims. (Cl. 226—20.8)

This invention relates to devices for use in pressure injecting a fluid mass into a pneumatic tire to provide, on the inner tube of a tire, a coating for rendering a tube substantially puncture-proof. More particularly, the invention deals with a device of the type and kind having suitable fittings, whereby the discharge end of the device may be directly coupled with the inflation nozzle of an inner tube and also with a compressed air supply line, whereby air from said supply line is utilized in displacing the mass from a containing cylinder directly into the inner tube.

The drawing is a side and sectional view of a device made according to my invention and also diagrammatically illustrating the method of its use.

In the drawing, I have shown at 1 an elongated cylinder, having a fixed closure cap 2, at one end, the cap having a substantially conical or contracted portion 3 terminating in a reduced part 4, having a projecting and serrated nipple 5, to which is suitably fixed a flexible tube 6. The tube 6 has, at its free end portion, a conventional cap 7 for engaging the inflation nozzle 8 of the inner tube of a tire, part of which is diagrammatically shown in perspective at 9.

At the other end of the cylinder 1 is a detachable and dome-shaped cap 10, having a substantially flat outer wall 11 and a short straight inner wall 12, which overlies the cylinder 1. Within the cap 10 is a rubber or other gasket 13, against which the end 14 of the cylinder 1 is adapted to seat in establishing a seal.

Welded or otherwise fixed to the wall 11 of the cap 10 and arranged within the cap is a bearing portion 15. Slidably mounted in the bearing portion 15 is an elongated tubular piston shaft 16, the bore 17 of which communicates with a transverse discharge 18 which opens into what may be termed the air end of the cylinder 1, or in other words, at the upper side of the piston 19 operating in the cylinder.

The piston 19 is double faced in the sense that it comprises upper and lower cup-shaped gaskets 20 and 21, the gasket 20 controlling and sealing the air end of the cylinder; whereas, the gasket 21 controls the fluid mass end of the cylinder. Arranged within each gasket is a metallic plate 22, 23, respectively, and the piston 19 is fixed to the inner end of the shaft 16 by a pair of nuts 24 and 25 mounted on the threaded portion 26 of the shaft. It will be understood that the inner end of the shaft 16 is sealed so that air introduced into the bore 17 is discharged only through the transverse port 18.

The shaft 16 is of sufficient length to move the piston 19 the full length of the cylinder and still leave the outer threaded end 27 beyond the limits of the cylinder and a retainer plate 28 which is employed.

The retainer plate 28 is substantially triangular in form and is apertured at its three corner portions to receive three bolts 29, only two of the bolts appearing by virtue of their arrangement. The bolts 29 have flattened inner ends 30 which are directly welded to the tube 1; whereas, the outer threaded ends 31 of the bolts are offset outwardly or radially, as seen at the left of the drawing.

Winged nuts 32 are mounted on the bolts 29 to apply pressure to the plate 28 in firmly supporting the cap 10 in seated position upon the end 14 of the cylinder.

At 33 I have indicated the end portion of an air supply tube having a coupling 34 for engagement with the threaded end 27 of the tubular shaft 16, so that air, under pressure, can be supplied to the cylinder 1 in movement of the piston 19 downwardly in discharge of a fluid mass from the cylinder into an inner tube.

In practice, the cylinder will be of such size as to contain the desired quantity of the mass to be injected into a tire so that, in one operation of the piston 19 from its extreme upper end to the extreme lower end, the mass will be discharged into the tire. However, in other instances, a control can be provided to regulate the supply of air to the cylinder and accordingly govern the amount of mass discharged therefrom.

It will be apparent that the cap 10 can be quickly removed from the cylinder, the piston 19 withdrawn, and the cylinder filled with a new supply of the mass employed.

Having fully described my invention, what I claim as new and desire to secure by Letters Patent is:

1. A device of the character described, comprising an elongated cylinder, a cap closing one end of the cylinder, said cap having a projecting serrated nipple, a flexible tube coupled with said nipple, a double sealed piston in said cylinder, a tubular shaft coupled with the piston and projecting from the other end portion of the cylinder, said last named end portion of the cylinder having a detachable cap, a ring for sealing the detachable cap on the cylinder, the detachable cap having a bearing in which the shaft is slidably mounted, the end of said shaft, protruding beyond and in axial alinement with the cylinder, being threaded for coupling of an air supply tube therewith, the inner end of said shaft having a discharge passage opening into the second named end portion of the cylinder, said piston comprising cup-shaped sealing gaskets exposed to opposed ends of the cylinder, plates supporting said gaskets in the cylinder and on said shaft, a plurality of bolts fixed to the cylinder and extending outwardly beyond end limits of the cylinder, a plate mounted on said bolts and bearing on said detachable cap, and nuts on said bolts for applying pressure to the plate and cap in securing the cap upon the cylinder.

2. A device for use in pressure injecting a fluid mass into an inner tube of a tire, said device comprising an elongated cylinder, one end portion of the cylinder having a flexible tube discharge, the other end of the cylinder having a detachable cap slidably fitting said cylinder, an elongated tubular shaft slidably engaging the cap, said shaft, at all times, protruding beyond said last named end of the cylinder, a piston coupled with the inner end of said shaft, the piston having a cup-shaped gasket facing the discharge end of the cylinder, another cup-shaped gasket facing the second named end of the cylinder, the shaft having a discharge port adjacent the last named gasket, means for coupling an air supply line with the outer end portion of the shaft for supply of air to the second named end of the cylinder to advance the piston in the direction of the discharge end of said cylinder, means for sealing the detachable cap on said end of the cylinder, a plurality of bolts fixed to and spaced circumferentially of said cylinder, said bolts being offset outwardly of the cylinder and projecting beyond the second named end thereof, a plate seated on said detachable cap, and nuts on said bolts engaging said plate in forcing the detachable cap in sealed position on said cylinder.

References Cited in the file of this patent

UNITED STATES PATENTS

| Number | Name | Date |
|---|---|---|
| 1,042,627 | Watson | Oct. 29, 1912 |